Patented Nov. 12, 1946

2,410,940

UNITED STATES PATENT OFFICE 2,410,940

PYRIDINE DERIVATIVES AND PROCESS FOR THE MANUFACTURE OF SAME

Max Hoffer, Nutley, N. J., assignor to Hoffmann-La Roche, Inc., Nutley, N. J., a corporation of New Jersey No Drawing. Original application September 2, 1941, Serial No. 409,298. Divided and this application May 11, 1945, Serial No. 593,317. In Switzerland September 2, 1940

2 Claims. (Cl. 260—297)

The present invention concerns the synthesis of vitamin B₆ (adermin) of the formula:

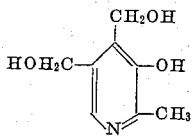

I have found that the compound of 2-methyl-4-phenoxymethyl-5-cyano-6-hydroxy-pyridine-3-carboxylic acid (I) is an advantageous starting material for this synthesis. It is prepared by successively treating the condensation product, obtained from malonic acid dinitrile, phenoxyacetaldehyde-hydrate and acetoacetic ester, with an acid and a reducing agent, in accordance with Example 3 of my co-pending application S. N. 409,298, filed September 2, 1941, entitled Hydroxy-pyridine derivatives and process for the manufacture of same.

By treatment with phosphorus-pentachloride the 2-methyl-4-phenoxymethyl-5-cyano-6-hydroxy-pyridine-3-carboxylic acid (I) is converted into 2-methyl-4-phenoxymethyl-5-cyano-6-chloro-pyridine-3-carboxylic acid chloride (II) and hydrazine caused to act thereon in the presence of free alkalis. The reaction can be illustrated by the following formulae:

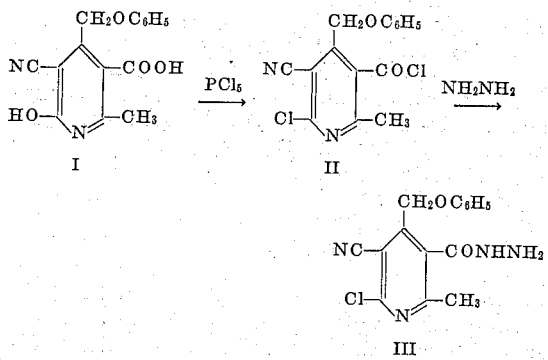

It is surprising that it is possible to introduce the hydrazine radical in the side-chain in position 3 without the halogen reacting in the α-position, although it is known that α-halogen substituted pyridine derivatives can react easily with hydrazine (Journal of the Chemical Society of London, vol. 103, year 1913, page 1978; vol. 107, year 1915, page 691; Monatshefte fur Chemie, vol. 36, year 1915, page 736). The desired reaction consequently only succeeds in presence of free alkalis. Curiously enough, the hydrazine formed thereby goes into the alkaline solution, from which it can be precipitated by neutralization of the alkali by means of free acids, ammonium salts or acid salts.

The 2-methyl-4-phenoxymethyl-5-cyano-6-chloro-pyridine-3-carboxylic acid hydrazide (III) thus obtained is converted into the azide by nitrous acid or materials developing nitrous acid during the reaction, and the azide boiled with alcohols either after its isolation or in the reaction mixture to form 2-methyl-3-carbalkoxyamino-4-phenoxymethyl-5-cyano-6-chloro-pyridine.

This compound can be converted in one step into 2-methyl-3-carbalkoxyamino-4-phenoxymethyl-5-aminomethyl-pyridine. The hydrogenation of the cyano group to the aminomethyl group has often been described in the literature. However, the working is thereby effected almost exclusively with palladium or platinum as catalyst in acid solution. On working in neutral solution and with nickel catalysts, on the other hand, secondary amines are mostly obtained (Helvetica Chimica Acta, vol. 5, year 1922, page 937; vol. 6, year 1923, page 880; vol. 8, year 1925, page 848).

It has now been found that 2-methyl-3-carbalkoxyamino-4-phenoxymethyl-5-cyano-6-chloro-pyridine, under suitable conditions, can also be reduced to the corresponding primary amine with nickel catalysts. Thereby, the chlorine atom in position 6 is simultaneously replaced by hydrogen. This course of the reaction could not be anticipated, for no case has become known so far where a chlorine atom adhering to a pyridine radical has been replaced by hydrogen by means of nickel as a catalyst. It was rather to be expected that chlorine would be obstructive during the hydrogenation (Adkins Reactions of Hydrogen with Organic Compounds over Copper-Chromiumoxide and Nickel Catalysts, Wisconsin, year 1937, page 54; Schwoegler, Journal of the American Chemical Society, vol. 61, year 1939, page 3502).

The 2-methyl-3-carbalkoxyamino-4-phenoxymethyl-5-aminomethyl-pyridine is converted into 2-methyl-3-carbalkoxyamino-4-phenoxy-methyl- 5-hydroxymethyl-pyridine (IV), by causing to act thereon nitrous acid or materials developing nitrous acid in presence of water.

The following formulae illustrate the conversion of said compound IV into adermin:

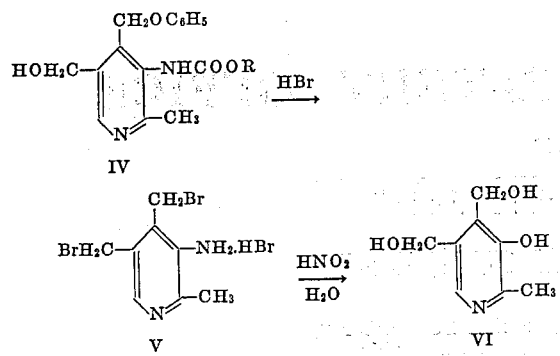

It has been found in the 2-methyl-3-carbalkoxy-amino-4-phenoxymethyl-5-hydroxymethyl-pyridine (IV) already at comparatively low temperatures not only the phenoxy radical can be saponified by treatment with hydrogen bromide, but also the urethane in one step. Thereby, 2-methyl-3-amino-4,5-dibromomethyl-pyridine-hydrobromide is obtained. By the action of water and nitrous acid or materials easily developing nitrous acid, it can readily be converted into adermin (VI, 2-methyl-3-hydroxy-4,5-dihydroxymethyl-pyridine) by heating.

I have also found that the aforementioned 2-methyl-4-phenoxymethyl-5-cyano-6-chloro-pyridine-3-carboxylic acid chloride (II) can be directly converted into the azide by treatment with sodium azide, and that 2-methyl-3-carbalkoxy-amino-4-phenoxymethyl-5-hydroxymethyl-pyridine (IV), may be saponified with diluted HCl at elevated temperatures and then treated with nitrous acid or materials developing nitrous acid, for instance, silver nitrite.

It is to be noted that the various conversions of the different groups may occur in one step, for instance, the formation of the acid chloride in 3 position may be accomplished together with the conversion of the hydroxy group in 6 position into halogen (chlorine) pyridine derivative. It can be done by acting upon the 2-methyl-4-phenoxymethyl-5-cyano-6-hydroxy-pyridine-3-carboxylic acid with phosphorus pentachloride.

Furthermore, the hydrogenation of the cyano group into the amino methyl group may take place concurrently with the substitution of the halogen by hydrogen, or the splitting off of the phenoxy radical by saponification may occur simultaneously with the saponification of the urethane into the amine.

*Example I*

20 parts by weight of 2-methyl-4-phenoxymethyl - 5 - cyano - 6 - hydroxypyridine - 3 - carboxylic acid are heated with 35 parts by weight of phosphorus-pentachloride and 50 parts by weight of phosphorus-oxychloride or with another indifferent solvent under reflux until all has gone into solution and the hydrogen chloride evolution has ceased. The solvent and the phosphorus-oxychloride formed are distilled off in vacuo as completely as possible and the crystalline residue, representing the acid chloride of 2-methyl - 4 - phenoxymethyl - 5 - cyano - 6 - chloropyridine-3-carboxylic acid, taken up in about 200 parts by volume of warm benzene. A solution of 7 parts by weight of hydrazine-hydrate in 100 parts by volume of a 10% solution of caustic soda is added dropwise to the benzene solution of the acid chloride while stirring, whereby the temperature is suitably kept below 30° C. Finally, another 50 parts by volume of a 10% solution of caustic soda are added and the mixture allowed to stand for 15 minutes. The brownish aqueous layer is removed from the benzene layer and acidified whereby the hydrazide separates as a brownish, crystalline precipitate. For the purpose of purification the product can be triturated with dilute ammonia and sucked off. Following this, it can be recrystallized from ethyl-acetate-petroleum ether.

2 - methyl - 4 - phenoxymethyl - 5 - cyano - 6-chloropyridine-3-carboxylic acid hydrazide is a colorless crystalline powder of melting point 114–115° C. It is easily soluble in alcohol and ethyl acetate, difficultly soluble in the cold in benzene and ether. It is difficultly soluble in water or petroleum ether. In dilute alkalis it is easily soluble and can be reprecipitated by addition of an acid, ammonium salts or acid salts.

10 parts by weight of 2-methyl-4-phenoxymethyl - 5 - cyano - 6 - chloropyridine - 3 - carboxylic acid hydrazide are dissolved in 50 parts by volume of absolute alcohol, a few drops of alcoholic hydrochloric acid and 5 parts by weight of amylnitrite added.

Crystalline precipitation of the azide quickly sets in, going into solution upon gentle heating with evolution of nitrogen. When the evolution of nitrogen has come to an end, the product is concentrated whereby 2-methyl-3-carbethoxyamino - 4 - phenoxymethyl - 5 - cyano - 6 - chloropyridine separates on cooling in the form of crystalline needles. For purification purposes the product is recrystallized from a little alcohol or from benzene. The melting point is at 167° C.

12 parts by weight of 2-methyl-3-carbethoxyamino - 4 - phenoxymethyl - 5 - cyano - 6 - chloropyridine are stirred up with 120 parts by weight of methanol, 12 parts by weight of 25% aqueous ammonia and 1.2 parts by weight of a nickel-catalyst (Raney nickel) in a hydrogenation-autoclave at a gauge pressure of 20 atm. and simultaneously slowly heated to 60° C. 3 mols of hydrogen are quickly taken up whereupon the hydrogenation is completely finished. The product is allowed to cool, separated from the catalyst and the entirely colorless filtrate dried in vacuo. The residue is taken up in 100 parts by volume of water, small quantities of undissolved material filtered off, the filtrate rendered acid to Congo paper with dilute hydrochloric acid and again evaporated to dryness in vacuo. The residue is recrystallized from ethanol. The resulting di-hydrochloride of 2-methyl-3-carbethoxyamino - 4 - phenoxymethyl - 5 - aminomethyl - pyridine melts at 238° C. The yield amounts to 90% of the theoretical.

10 parts by weight of 2-methyl-3-carbethoxyamino - 4 - phenoxymethyl - 5 - amino - methylpyridine-hydrochloride are dissolved in 100 parts by volume of 5% hydrochloric acid, the solution heated and a solution of 5 parts by weight of sodiumnitrite in water added dropwise at 90–95° C. After the evolution of nitrogen and oxides of nitrogen has ceased the product is allowed to cool and rendered alkaline with ammonia. The compound first separates as an oil and becomes crystalline on standing. It is sucked off and recrystallized from benzene. 2-methyl-3-carbethoxyamine - 4 - phenoxymethyl - 5 - hydroxymethylpyridine forms white prismatic needles of melting point 127° C.

4 parts by weight of 2-methyl-3-carbethoxy-amino - 4 - phenoxymethyl - 5 - hydroxymethyl-pyridine are heated with 40 parts by volume of hydrobromic acid (about 50%) for 10 minutes at 65–70° C. until the $CO_2$ development is terminated. The product is now evaporated in vacuo almost to dryness, allowed to crystallize overnight and taken up with alcohol in which the bromo-compound is difficultly soluble and is sucked off. By concentration of the mother liquor further quantities of the bromo-compound are obtained.

This is dissolved in 100 parts by volume of water and boiled for 20 minutes. Thereupon 10 parts by volume of 3-n hydrochloric acid are added and 1.5 parts by weight of freshly prepared silver nitrite quickly added while stirring at 90° C. After the cessation of evolution of nitrogen and oxides of nitrogen the product is filtered off from silver bromide and silver chloride and concentrated in vacuo. The residue crystallizes spontaneously, if need be upon rubbing with acetone, and proves to be vitamin $B_6$-hydrochloride (adermin) of melting point 206–207° C.

Example II 32 parts of the 2-methyl-4-phenoxymethyl-5-cyano - 6 - chloro - pyridine - 3 - carboxylic acid chloride melting point 155–157° which has been prepared according to Example I are dissolved by 200 parts by volume dioxane while stirring. The solution is cooled to 5° C. and is dropped at that temperature into a solution of 10 parts of sodium azide in 50 parts of water. Stirring is continued for one hour during which the azide gradually precipitates. 100 parts of water are added to assist complete precipitation and the precipitate is suction filtered after some time, and is washed with water and then with a little cold alcohol. It is suspended in 300 parts of alcohol with stirring and is converted into the 2-methyl-4-phenoxy-methyl-5-cyano-6-chlor-urethane and worked up into adermin, both as in Example I.

Example III 31.5 parts of 2-methyl-4-phenoxymethyl-5-hydroxymethyl-pyridine-3-urethane are heated in 500 parts of 2.5% hydrochloric acid to 170–180° C. for 5 hours. The brown solution is decolorized with animal charcoal and is stirred up with 18 parts silver nitrite at 70–80° C. The silver chloride is filtered off and the solution is concentrated in vacuo during which time adermin crystallizes from the solution.

This application is a division of my earlier application Serial Number 409,298, filed September 2, 1941.

What I claim is:

1. The compound 2 - methyl - 3 - carbalkoxy-amino - 4 - phenoxymethyl - 5 - hydroxy - methyl-pyridine.

2. The compound 2 - methyl - 3 - carbethoxy-amino - 4 - phenoxymethyl - 5 - hydroxy - methyl-pyridine, having a melting point of about 127° C.

MAX HOFFER.